(12) United States Patent
Takahashi

(10) Patent No.: US 12,411,376 B2
(45) Date of Patent: Sep. 9, 2025

(54) LIGHT CONTROL SHEET AND LIGHT CONTROL DEVICE

(71) Applicant: TOPPAN Inc., Tokyo (JP)

(72) Inventor: Yusuke Takahashi, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 195 days.

(21) Appl. No.: 18/459,478

(22) Filed: Sep. 1, 2023

(65) Prior Publication Data

US 2023/0413405 A1 Dec. 21, 2023

Related U.S. Application Data

(63) Continuation of application No. PCT/JP2022/009522, filed on Mar. 4, 2022.

(30) Foreign Application Priority Data

Mar. 5, 2021 (JP) .................................. 2021-035328

(51) Int. Cl.
| G02F 1/1334 | (2006.01) |
| G02F 1/1339 | (2006.01) |
| H05B 47/17 | (2020.01) |

(52) U.S. Cl.
CPC ........ *G02F 1/1334* (2013.01); *G02F 1/13392* (2013.01); *H05B 47/17* (2020.01)

(58) Field of Classification Search
None
See application file for complete search history.

(56) References Cited

U.S. PATENT DOCUMENTS

| 2018/0307077 A1 | 10/2018 | Miura et al. |
| 2020/0012138 A1 | 1/2020 | Yamada et al. |
| (Continued) | | |

FOREIGN PATENT DOCUMENTS

| JP | 8-110524 A | 4/1997 |
| JP | 2000-258758 A | 9/2000 |
| (Continued) | | |

OTHER PUBLICATIONS

International Search Report issued May 24, 2022 in PCT/JP2022/009522 filed Mar. 4, 2022, 5 pages.
(Continued)

*Primary Examiner* — Mariceli Santiago
(74) *Attorney, Agent, or Firm* — Oblon, McClelland, Maier &Neustadt, L.L.P.

(57) ABSTRACT

Thicknesses of a light control layer in measurement positions are within the range of 0.8 times to 1.2 times the median value of the thicknesses. In a characteristic curve obtained by measuring a change of a linear transmittance of visible light when a drive voltage applied to transparent electrode layers is changed, first voltage is a lower limit drive voltage in the range in which a change ratio of a linear transmittance is 0.5%/V or more, second voltage is an upper limit drive voltage, and a middle value is between the first voltage and the second voltage. The variance in the middle value is 35.0% or less. The variance is obtained by dividing a difference between the minimum value and the maximum value of middle values obtained from the characteristic curves of the measurement positions, by an average value of the middle values.

16 Claims, 9 Drawing Sheets

(56) References Cited

U.S. PATENT DOCUMENTS

2021/0141259 A1\*   5/2021  Yoshino ............. G02F 1/13439
2022/0121054 A1     4/2022  Yasuhara
2023/0408884 A1\*  12/2023  Takahashi ............. G02F 1/1334

FOREIGN PATENT DOCUMENTS

| JP | 2017-097339  A |   | 6/2017  |         |          |
|----|----------------|---|---------|---------|----------|
| JP | 2017-187775  A |   | 10/2017 |         |          |
| JP | 2019-090951  A |   | 6/2019  |         |          |
| JP | 2020-109441  A |   | 7/2020  |         |          |
| JP | 2021-9188    A |   | 1/2021  |         |          |
| JP | 2021182093   A | \* | 11/2021 |         |          |
| JP | 2022099785   A | \* | 7/2022  |         |          |
| WO | WO-2019132009 A1 | \* | 7/2019 | ............. | B60J 1/001 |

OTHER PUBLICATIONS

Extended European Search Report issued Jul. 26, 2004 in European Patent Application No. 22763442.5, 8 pages.

\* cited by examiner

FIG.12

| | | | EXAMPLE1 | EXAMPLE2 | EXAMPLE3 | EXAMPLE4 | COMPARATIVE EXAMPLE1 | COMPARATIVE EXAMPLE2 |
|---|---|---|---|---|---|---|---|---|
| MEASUREMENT POINT1 | TRANSMITTANCE (%) | Ta | 1.5 | 5.0 | 33.6 | 27.8 | 4.1 | 12.5 |
| | | Tb | 83.6 | 82.0 | 84.0 | 76.5 | 84.3 | 63.3 |
| | VOLTAGE (V) | Va | 5.0 | 10.0 | 15.0 | 15.0 | 10.0 | 25.0 |
| | | Vb | 30.0 | 30.0 | 35.0 | 35.0 | 35.0 | 120.0 |
| | | V1/2 | 17.5 | 20.0 | 25.0 | 25.0 | 22.5 | 72.5 |
| MEASUREMENT POINT2 | TRANSMITTANCE (%) | Ta | 4.6 | 5.1 | 5.1 | 29.7 | 4.3 | 12.7 |
| | | Tb | 84.5 | 81.9 | 81.7 | 76.8 | 84.6 | 63.4 |
| | VOLTAGE (V) | Va | 5.0 | 10.0 | 10.0 | 15.0 | 10.0 | 25.0 |
| | | Vb | 30.0 | 30.0 | 30.0 | 35.0 | 35.0 | 120.0 |
| | | V1/2 | 17.5 | 20.0 | 20.0 | 25.0 | 22.5 | 72.5 |
| MEASUREMENT POINT3 | TRANSMITTANCE (%) | Ta | 9.5 | 4.4 | 5.0 | 32.9 | 4.6 | 13.1 |
| | | Tb | 83.8 | 81.7 | 82.0 | 76.5 | 83.7 | 69.0 |
| | VOLTAGE (V) | Va | 10.0 | 5.0 | 10.0 | 15.0 | 5.0 | 25.0 |
| | | Vb | 30.0 | 25.0 | 30.0 | 35.0 | 25.0 | 130.0 |
| | | V1/2 | 20.0 | 15.0 | 20.0 | 25.0 | 15.0 | 77.5 |
| MEASUREMENT POINT4 | TRANSMITTANCE (%) | Ta | 5.4 | 5.2 | 14.9 | 6.0 | 4.8 | 12.7 |
| | | Tb | 82.7 | 82.3 | 83.7 | 76.7 | 82.0 | 69.5 |
| | VOLTAGE (V) | Va | 5.0 | 10.0 | 10.0 | 10.0 | 10.0 | 25.0 |
| | | Vb | 25.0 | 30.0 | 25.0 | 35.0 | 30.0 | 130.0 |
| | | V1/2 | 15.0 | 20.0 | 17.5 | 22.5 | 20.0 | 77.5 |
| MEASUREMENT POINT5 | TRANSMITTANCE (%) | Ta | 8.9 | 4.4 | 33.6 | 28.7 | 38.9 | 12.5 |
| | | Tb | 83.4 | 82.5 | 83.9 | 76.3 | 80.5 | 68.2 |
| | VOLTAGE (V) | Va | 10.0 | 5.0 | 15.0 | 15.0 | 15.0 | 25.0 |
| | | Vb | 30.0 | 25.0 | 35.0 | 35.0 | 35.0 | 130.0 |
| | | V1/2 | 20.0 | 15.0 | 25.0 | 25.0 | 25.0 | 77.5 |
| SPACER AREA OCCUPANCY RATIO (%) | | | 1.5 | 15.0 | 0.9 | 30.0 | 0.45 | 1.5 |
| VARIANCE IN THICKNESS OF LIGHT CONTROL LAYER | | | ±8% | ±4% | ±20% | ±4% | ±40% | ±8% |
| VARIANCE IN MIDDLE VALUE OF VOLTAGE | | | 27.8 | 27.8 | 34.9 | 10.2 | 47.6 | 6.6 |
| SIZE OF VOIDS (μm) | MINIMUM VALUE | | 0.5 | 0.5 | 0.5 | 0.4 | 0.4 | UNMEASURABLE |
| | MAXIMUM VALUE | | 2.0 | 2.2 | 1.5 | 2.2 | 2.1 | UNMEASURABLE |
| | AVERAGE | | 1.3 | 1.3 | 1.0 | 1.3 | 1.2 | — |
| APPEARANCE | | | EXCELLENT | EXCELLENT | EXCELLENT | GOOD | POOR | EXCELLENT |
| VOLTAGE REQUIRED FOR SWITCHING Vb-Va | | | 22.0 | 20.0 | 11.0 | 21.0 | 22.0 | 101.0 |

(EXAMPLE 1)

(EXAMPLE 2)

(EXAMPLE 3)

(EXAMPLE 4)

(COMPARATIVE EXAMPLE 1)

(COMPARATIVE EXAMPLE 2)

(EXAMPLE 1)

(EXAMPLE 2)

(EXAMPLE 3)

(EXAMPLE 4)

(COMPARATIVE EXAMPLE 1)

(COMPARATIVE EXAMPLE 2)

LIGHT CONTROL SHEET AND LIGHT CONTROL DEVICE

CROSS-REFERENCE TO RELATED APPLICATIONS

The present application is a continuation of and claims the benefit of priority to International Application No. PCT/JP2022/009522, filed Mar. 4, 2022, which is based upon and claims the benefit of priority to Japanese Application No. 2021-035328, filed Mar. 5, 2021. The entire contents of these applications are incorporated herein by reference.

BACKGROUND OF THE INVENTION

Field of the Invention

The present invention relates to a light control sheet and a light control device which have a variable linear transmittance.

Description of Background Art

JP 2017-187775 A describes a light control sheet includes a light control layer that contains a liquid crystal composition, and a pair of transparent electrode layers that sandwich the light control layer. The entire contents of this publication are incorporated herein by reference.

SUMMARY OF THE INVENTION

According to one aspect of the present invention, a light control sheet includes a light control layer including a resin layer and orientation particles, a pair of transparent electrode layers sandwiching the light control layer, and a pair of transparent support layers sandwiching the light control layer and the pair of transparent electrode layers. The light control layer has thicknesses measured in multiple measurement positions such that the thicknesses are within the range of 0.8 times to 1.2 times a median value of the thicknesses and has a structure such that the resin layer has voids and that the orientation particles are contained in the voids dispersed in the resin layer, and a variance in a middle value, $\{(Vmax-Vmin)/Vavr\} \times 100$, is 35.0% or less, where Vmin is the minimum value, Vmax is the maximum value, Vavr is an average value of middle values obtained from characteristic curves in the measurement positions, each of the characteristic curves is obtained by measuring a change of a linear transmittance of visible light when a drive voltage applied to the transparent electrode layers is changed, each of the middle values is a middle a value Vm between a first voltage Va and a second voltage Vb, the first voltage Va is a lower limit drive voltage of a range in which an absolute value of a change ratio in the linear transmittance is 0.5%/V or more, and the second voltage Vb is an upper limit drive voltage.

According to another aspect of the present invention, a light control device includes a light control sheet that changes a linear transmittance depending on a drive voltage, and a driving unit including circuitry that controls a drive voltage applied to the light control sheet. The light control sheet includes a light control layer including a resin layer and orientation particles, a pair of transparent electrode layers sandwiching the light control layer, and a pair of transparent support layers sandwiching the light control layer and the pair of transparent electrode layers, the light control layer has thicknesses measured in multiple measurement positions such that the thicknesses are within the range of 0.8 times to 1.2 times a median value of the thicknesses and has a structure such that the resin layer has voids and that the orientation particles are contained in the voids dispersed in the resin layer, a variance in a middle value, $\{(Vmax-Vmin)/Vavr\} \times 100$, is 35.0% or less, where Vmin is the minimum value, Vmax is the maximum value, Vavr is an average value of middle values obtained from characteristic curves in the measurement positions, each of the characteristic curves is obtained by measuring a change of a linear transmittance of visible light when a drive voltage applied to the transparent electrode layers is changed, each of the middle values is a middle a value Vm between a first voltage Va and a second voltage Vb, the first voltage Va is a lower limit drive voltage of a range in which an absolute value of a change ratio in the linear transmittance is 0.5%/V or more, the second voltage Vb is an upper limit drive voltage, and the circuitry of the driving unit switches among a first mode of not applying the drive voltage, a second mode of applying a voltage of equal to or more than the second voltage Vb, and a third mode of applying a voltage between the first voltage Va and the second voltage Vb such that a linear transmittance of the light control sheet becomes a linear transmittance between a linear transmittance in the first mode and a linear transmittance in the second mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12 is a table illustrating evaluation results of Examples 1 to 4 and Comparative Examples 1 and 2;

DETAILED DESCRIPTION OF THE EMBODIMENTS

Figure 1:
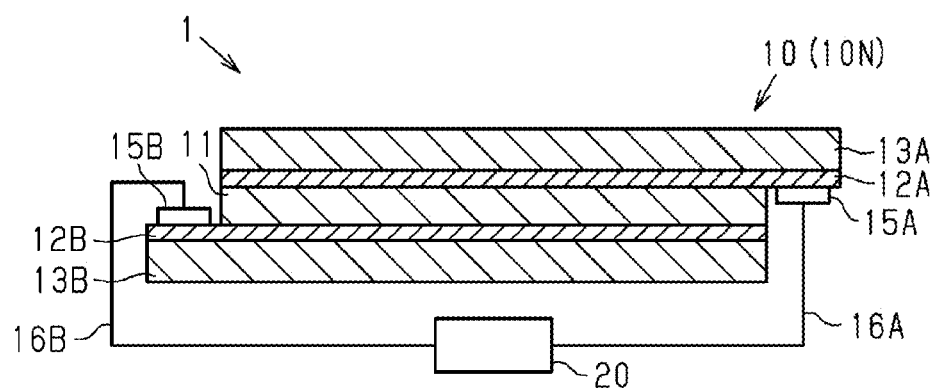
FIG. 1 is a cross-sectional view illustrating a normal-type light control sheet.

Embodiments will now be described with reference to the accompanying drawings, wherein like reference numerals designate corresponding or identical elements throughout the various drawings.

A light control sheet and a light control device according to embodiments of the present invention will be described with reference to the drawings.

Light Control Device

Fundamental structures of a light control sheet and a light control device according to embodiments of the present invention will be described with reference to FIG. 1.

As illustrated in FIG. 1, a light control device 1 includes a light control sheet 10 and a driving unit 20 that controls a drive voltage applied to the light control sheet 10. The light control sheet 10 may have a normal-type structure in which the linear transmittance of visible light is high during energization and low during non-energization. The light control sheet 10 may have a reverse-type structure in which the linear transmittance is low during energization and high during non-energization.

It is noted that in the present embodiment, a normal-type light control sheet 10N will be mainly described. Also, configuration that is common between the normal-type and the reverse-type will be merely described as the light control sheet 10. A linear transmittance T, also referred to as a parallel transmittance, is a transmittance of incident light that is parallel to the normal direction of the surface of a light control sheet 100.

The normal-type light control sheet 10N includes a light control layer 11, a first transparent electrode layer 12A and a second transparent electrode layer 12B which are a pair of transparent electrode layers, and a first transparent support layer 13A and a second transparent support layer 13B which are a pair of transparent support layers. The first transparent electrode layer 12A and the second transparent electrode layer 12B sandwich the light control layer 11. The first transparent support layer 13A and the second transparent support layer 13B sandwich the light control layer 11, the first transparent electrode layer 12A, and the second transparent electrode layer 12B. The light control layer 11 is positioned between the first transparent electrode layer 12A and the second transparent electrode layer 12B. The light control layer 11 is in contact with the first transparent electrode layer 12A and the second transparent electrode layer 12B. The first transparent support layer 13A supports the first transparent electrode layer 12A. The second transparent support layer 13B supports the second transparent electrode layer 12B.

The surface of the first transparent electrode layer 12A is connected to a first terminal unit 15A. The first terminal unit 15A is connected to the driving unit 20 via a wiring 16A. The surface of the second transparent electrode layer 12B is connected to a second terminal unit 15B. The second terminal unit 15B is connected to the driving unit 20 via a wiring 16B. The first terminal unit 15A is disposed to a region in the end portion of the light control sheet 10N where the first transparent electrode layer 12A is exposed. The second terminal unit 15B is disposed to a region in the end portion of the light control sheet 10N where the second transparent electrode layer 12B is exposed. The first terminal unit 15A and the second terminal unit 15B constitute a part of the light control sheet 10N.

The driving unit 20 applies a drive voltage between the first transparent electrode layer 12A and the second transparent electrode layer 12B. The intensity of the drive voltage is variable and controlled by the driving unit 20.

The light control layer 11 contains a transparent resin layer and a liquid crystal composition. The light control layer 11 contains, for example, Polymer Dispersed Liquid Crystals (PDLCs), Polymer Network Liquid Crystals (PNLCs), and Nematic Curvilinear Aligned Phases (NCAPs). In the light control layer 11 that contains polymer dispersed liquid crystals, multiple independent voids or voids having shapes partially joined with independent shapes are included in the resin layer, and a liquid crystal composition is retained in the voids. Polymer network liquid crystals have a three-dimensional mesh-like polymer network and retain liquid crystal molecules as oriented particles in voids in the polymer network. A nematic curvilinear aligned phase layer retains an encapsulated liquid crystal composition in a resin layer. The light control layer 11 of the present embodiment contains polymer dispersed liquid crystals.

Examples of the liquid crystal molecules as oriented particles include any one or more of those based on Schiff bases, azo, azoxy, biphenyl, terphenyl, benzoic acid ester, tolan, pyrimidine, cyclohexanecarboxylic acid ester, phenylcyclohexane, and dioxane types. The liquid crystal molecules contained in the light control layer 11 have, for example, positive dielectric anisotropy and a dielectric constant higher in their major axis direction than in their minor axis direction.

The first transparent electrode layer 12A and the second transparent electrode layer 12B each have transparency that allows visible light to pass therethrough. Materials for forming the first transparent electrode layer 12A and the second transparent electrode layer 12B may be, for example, any one selected from a group of indium tin oxide (ITO), fluorine-doped tin oxide (FTO), tin oxide, zinc oxide, carbon nanotubes (CNT), and poly(3,4-ethylenedioxythiophene) (PEDOT).

The first transparent support layer 13A and the second transparent support layer 13B allow visible light to pass therethrough. The first transparent support layer 13A and the second transparent support layer 13B may be a synthetic resin or an inorganic compound. Examples of the synthetic resin include polyester, polyacrylate, polycarbonate, and polyolefin. Examples of the polyester include polyethylene terephthalate (PET) and polyethylene naphthalate. Examples of the polyacrylate include polymethyl methacrylate. Examples of the inorganic compound include silicon dioxide, silicon oxynitride, and silicon nitride.

The first terminal unit 15A and the second terminal unit 15B may be, for example, a flexible printed circuit (FPC). The FPC includes a support layer, a conductor, and a protective layer. The conductor is sandwiched between the support layer and the protective layer. The support layer and the protective layer are formed of an insulating synthetic resin. The support layer and the protective layer are formed of, for example, polyimide. The conductor is formed of, for example, a metal thin film. A material for forming the metal thin film may be, for example, copper. The first terminal unit 15A and the second terminal unit 15B are not limited to an FPC and may be, for example, a metal tape.

It is noted that the first terminal unit 15A and the second terminal unit 15B are respectively bonded to the first transparent electrode layer 12A and the second transparent electrode layer 12B through an unillustrated conductive adhesive layer. In a part of each of the first terminal unit 15A and the second terminal unit 15B to which the conductive adhesive layer is bonded, the conductor is exposed from the protective layer or the support layer. The conductive adhesive layer may be formed of, for example, an anisotropic conductive film (ACF), an anisotropic conductive paste (ACP), an isotropic conductive film (ICF), or an isotropic conductive paste (ICP). From the viewpoint of handling properties in the production process of the light control device 1, the conductive adhesive layer is preferably an anisotropic conductive film.

The wirings 16A and 16B are formed of, for example, a metal wire and an insulating layer covering the metal wire. The wire is formed of, for example, copper.

The driving unit 20 applies a drive voltage between the first transparent electrode layer 12A and the second transparent electrode layer 12B. The drive voltage may be an AC voltage having a rectangular wave shape. The drive voltage may be an AC voltage having a sinusoidal wave shape. The drive voltage may be a DC voltage.

The light control layer 11 changes the orientation of liquid crystal molecules in response to a change in voltage between the first transparent electrode layer 12A and the second transparent electrode layer 12B. The change in the orientation of liquid crystal molecules changes the scattering degree, absorption degree, and transmittance degree of visible light incident on the light control layer 11.

Light Control Sheet

With reference to FIG. 2 to FIG. 6, the structure of the normal-type light control sheet 10N will be described together with drive modes of the light control device 1. The light control device 1 has three drive modes: transparent mode, opaque mode, and middle tone mode. In the light control sheet 10N of the present embodiment, the opaque mode is an example of the first mode, the transparent mode is an example of the second mode, and the middle tone mode is an example of the third mode.

Figure 2:
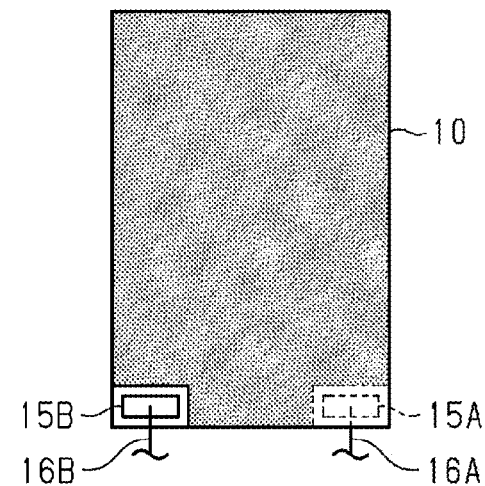
FIG. 2 is a plan view illustrating a light control sheet in an opaque mode.

FIG. 2 is a view of the light control sheet 10N in the opaque mode. The opaque mode is a mode in which the linear transmittance of visible light of the light control sheet 10N is smallest within the variation range of the linear transmittance in the light control sheet 10N. In the opaque mode, no drive voltage is applied between the first transparent electrode layer 12A and the second transparent electrode layer 12B.

Figure 3:
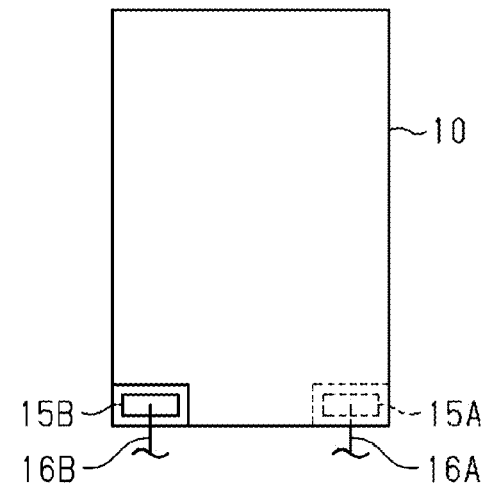
FIG. 3 is a plan view illustrating a light control sheet in a transparent mode.

FIG. 3 is a view of the light control sheet 10N in the transparent mode. The transparent mode is a mode in which the linear transmittance of visible light of the light control sheet 10N is greatest within the variation range of the linear transmittance in the light control sheet 10N. In the transparent mode, a drive voltage having a predetermined intensity is applied between the first transparent electrode layer 12A and the second transparent electrode layer 12B.

Figure 4:
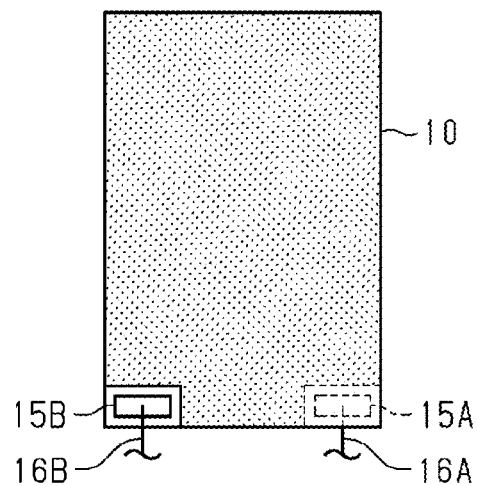
FIG. 4 is a plan view illustrating a light control sheet in a middle tone mode.

FIG. 4 is a view of the light control sheet 10N in the middle tone mode. The middle tone mode is a drive mode in which a linear transmittance between the linear transmittance of visible light in the opaque mode and the linear transmittance in the transparent mode is expressed in the light control sheet 10N. The middle tone mode is a drive mode in which the light control sheet 10N becomes semi-transmissive and semi-scattering. A haze, which is a cloudiness of the middle tone, is adjustable depending on the application. In the middle tone mode, a voltage smaller than a drive voltage applied in the transparent mode is applied between the first transparent electrode layer 12A and the second transparent electrode layer 12B.

Figure 5:
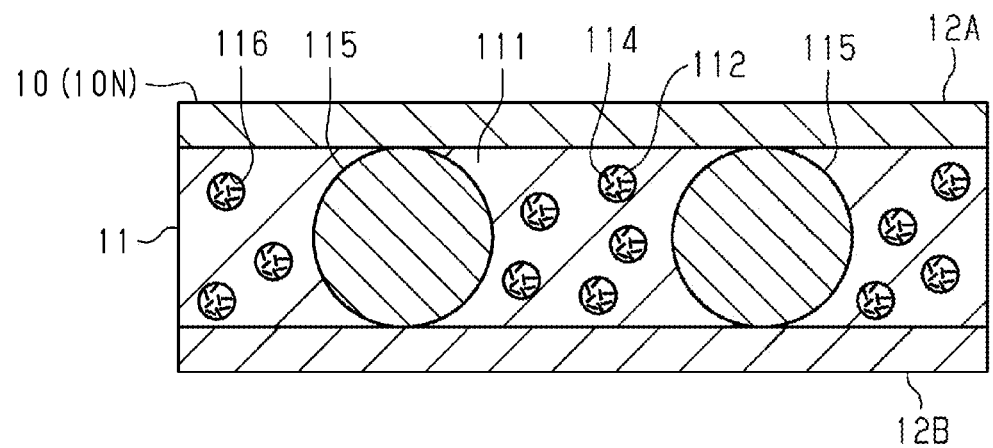
FIG. 5 is a cross-sectional view illustrating a light control sheet in an opaque mode.
Figure 6:
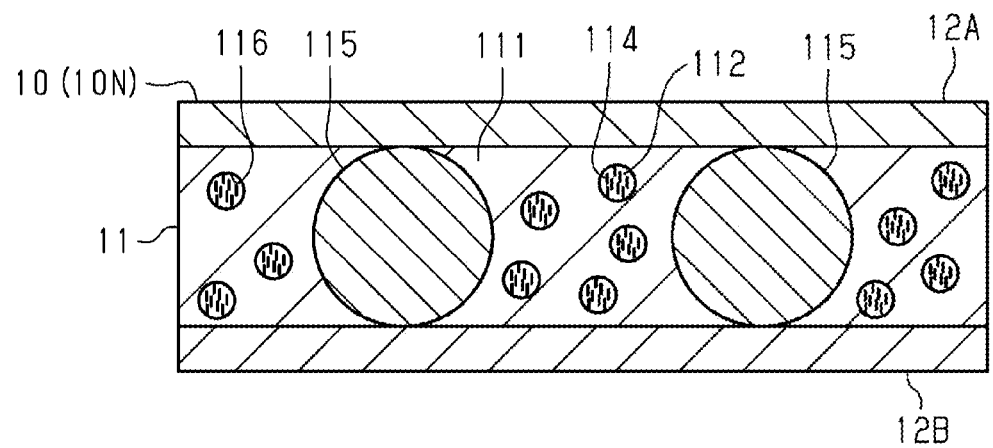
FIG. 6 is a cross-sectional view illustrating a light control sheet in a transparent mode.

With reference to FIG. 5 and FIG. 6, the light control layer 11 will be described in detail. FIG. 5 is a view schematically illustrating the cross-sectional structure of the light control sheet 10N in the opaque mode. Illustration of the first transparent support layer 13A and the second transparent support layer 13B is omitted. The light control layer 11 includes, in addition to a resin layer 111 and a liquid crystal composition 112, multiple spacers 115. The spacers 115 are positioned between the first transparent electrode layer 12A and the second transparent electrode layer 12B. The spacers 115 are not particularly limited as long as they have a shape that allows for control of a gap between the first transparent electrode layer 12A and the second transparent electrode layer 12B. For example, the spacers 115 contain resin as a main component and have a spherical or columnar shape. The spacers 115 allow visible light to pass therethrough.

The resin layer 111 and the liquid crystal composition 112 are positioned in a space between the first transparent electrode layer 12A and the second transparent electrode layer 12B and fill a space around the spacers 115 dispersed in the space. The resin layer 111 has multiple voids 116. The voids 116 may have independent shapes or shapes in which a part of an independent shape of one of the voids 116 is joined with another of the voids 116. The liquid crystal composition 112 fills the voids 116. The liquid crystal composition 112 contains liquid crystal molecules 114.

When the drive mode of the light control sheet 10N is the opaque mode, the major axis of the liquid crystal molecules 114 extends along a direction other than the normal direction of the first transparent electrode layer 12A, for example, in irregular directions. Therefore, visible light incident on the light control layer 11 is scattered by a difference between the refractive index of the liquid crystal composition 112 in the voids 116 and the refractive index of the resin layer 111. Also, the linear transmittance decreases compared to that of the light control sheet 10N in the transparent mode, and transparency is lowered.

FIG. 6 is a view illustrating the light control sheet 10N driven in the transparent mode when a drive voltage for the transparent mode is applied between the first transparent electrode layer 12A and the second transparent electrode layer 12B. The major axis of the liquid crystal molecules 114 is oriented so as to be parallel or substantially parallel to the normal direction of the first transparent electrode layer 12A. Accordingly, scattering of light incident on the light control layer 11 decreases. Also, the linear transmittance increases compared to that of the light control sheet 10N in the opaque mode, and transparency increases.

In the light control sheet 10N driven in the middle tone mode, the major axis of the liquid crystal molecules 114 intersects the normal line of the first transparent electrode layer 12A. Accordingly, scattering of incident light is greater than the light control sheet 10N in the transparent mode and is less than the light control sheet 10N in the opaque mode.

The thickness of each layer constituting the light control sheet 10N illustrated in FIG. 1 and FIGS. 5 and 6 and the thickness ratio to other layers are presented for descriptive purposes and are different from an actual thickness of each layer and thickness ratio to other layers. The thickness of the first transparent support layer 13A and the second transparent support layer 13B is, for example, 50 µm or more and 250 µm or less. The thickness of the first transparent electrode layer 12A and the second transparent electrode layer 12B is, for example, 5 nm or more and 100 nm or less. When the thickness of the first transparent electrode layer 12A and the second transparent electrode layer 12B is 5 nm or more and 100 nm or less, drive of the light control sheet 10N can be stabilized, and cracks occurring in the transparent electrode layer can be reduced. The thickness of the light control layer 11 is, for example, 2 µm or more and less than 30 µm. If phase separation between the resin layer 111 and the liquid crystal composition 112 is required to easily proceed in the formation of the light control layer 11, the thickness of the light control layer 11 is preferably 30 µm or less.

This light control sheet 10 is attached to, for example, a window of a mobile object such as a vehicle or an aircraft. Further, the light control sheet 10 may be attached to, for example, windows of various buildings such as houses, stations, and airports, partitions installed in offices, display windows installed in stores, and screens on which images are projected. The shape of the light control sheet 10 is not particularly limited as long as it corresponds to an object to be attached to and may be planar or curved. When the light control sheet 10 is attached to these objects and controlled to be in the middle tone mode, an observer can visually recognize the existence of an object positioned opposite the observer position with the light control sheet 10 in between, and cannot clearly see the object.

Method of Producing Light Control Sheet

An example of the method of producing the light control sheet 10N will be described. There are prepared a sheet that includes a first transparent support layer 13A having on its surface a first transparent electrode layer 12A and a sheet that includes a second transparent support layer 13B having on its surface a second transparent electrode layer 12B. The first transparent electrode layer 12A and the second transparent electrode layer 12B are formed by a thin film formation method such as sputtering, vacuum deposition, and coating.

Next, a liquid body that contains spacers 115 including as a main raw material divinylbenzene and others and a dispersion medium in which the spacers 115 are dispersed is applied on at least one of the first transparent electrode layer 12A and the second transparent electrode layer 12B. Furthermore, the sheet applied with the liquid body is heated to remove the dispersion medium.

A coating material as a precursor of a light control layer 11 is prepared. The coating material contains a polymerizable composition and a liquid crystal composition. Then, the coating material is applied on at least one of the first transparent electrode layer 12A and the second transparent electrode layer 12B on which the spacers 115 have been dispersed to thereby form a precursor layer. Next, the pair of sheets is bonded such that the precursor layer is sandwiched between the first transparent electrode layer 12A and the second transparent electrode layer 12B. The precursor layer is formed by a coating method such as an ink jet method, gravure coating method, spin coating method, slit coating method, bar coating method, flexo coating method, die coating method, dip coating method, and roll coating method.

Subsequently, light having a wavelength that allows a polymerization reaction of the polymerizable composition to proceed, such as ultraviolet light, is emitted onto a laminate including the precursor layer, the first transparent electrode layer 12A, the second transparent electrode layer 12B, the first transparent support layer 13A, and the second transparent support layer 13B. Accordingly, monomers and oligomers contained in the polymerizable composition of the precursor layer are polymerized. Also, phase separation between the resin layer 111 and the liquid crystal composition 112 proceeds. Then, a light control layer 11 in which liquid crystal molecules are retained in the voids 116 is formed.

The laminate is formed, for example, into large sheets by utilizing a roll-to-roll technique. A part of the laminate is cut out into a desired shape that corresponds to an object to have the light control sheet 10N attached. Then, a first terminal unit 15A and a second terminal unit 15B are formed to the cut-out sheet as a part of the laminate, and thus a light control sheet 10N is formed.

Middle Tone

Next, bringing a light control sheet 100 of a Reference Example into in the middle tone will be described. In the reference example, the light control sheet 100 is of the normal-type. The drive voltage applied to the light control sheet 100 of the Reference Example is higher than the drive voltage applied in the opaque mode and lower than the drive voltage applied in the transparent mode. Accordingly, it is possible to drive the light control sheet 100 to have a middle tone that is intermediate between transparency and opaqueness. However, merely adjusting the drive voltage is not enough to obtain an aesthetic appearance of the light control sheet 100 of the Reference Example when the light control sheet 100 is driven to have a middle tone.

Figure 7:
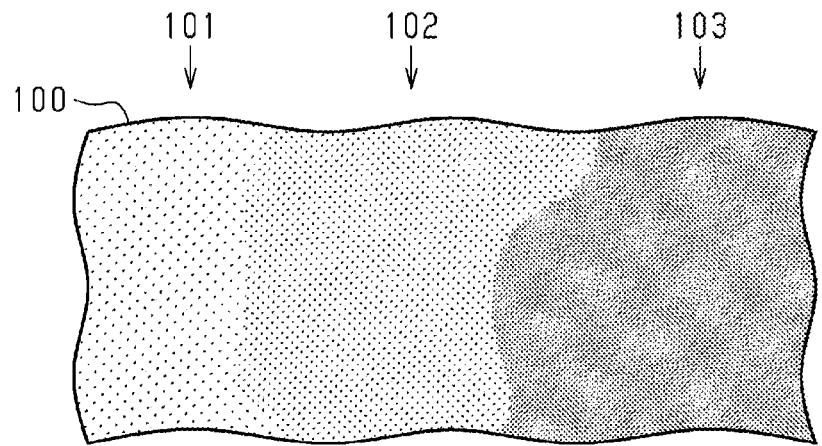
FIG. 7 is a plan view illustrating a light control sheet of Reference Example exhibiting a middle tone.

FIG. 7 is a view schematically illustrating a part of the light control sheet 100 of the Reference Example driven to have a middle tone. The light control sheet 100 has variations in linear transmittance. This light control sheet 100 includes a region 101 having a high linear transmittance, a region 103 having a low linear transmittance, and a region 102 that is between the region 101 having a high linear transmittance and the region 103 having a low linear transmittance. When the variance in a linear transmittance is large in this manner in the plane of the light control sheet 100, the linear transmittance differs between part of the light control sheet 100 and other parts adjacent to that part. As a result, some parts of the light control sheet 100 appear mottled, which deteriorates the aesthetic appearance of the light control sheet 100. In addition, if the light control sheet 100 driven to produce the middle tone is transparent in parts, the function of the middle tone may not be sufficiently exerted. It is noted that the example illustrated in FIG. 7 schematically illustrates the light control sheet 100 exhibiting a mottled appearance. The linear transmittance in the light control sheet 100 driven into the middle tone is varied to a degree that one light control sheet 100 is visually recognized as having three or more separate regions or varied such that regions having linear transmittances different from one another exhibit a geometric shape or an irregular shape other than a stripe shape.

Figure 8:
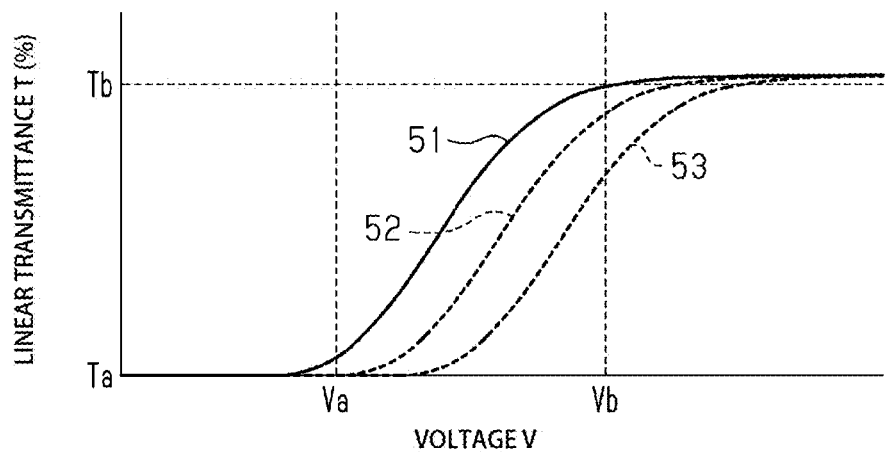
FIG. 8 is a graph illustrating a voltage vs. linear transmittance curve of a light control sheet of a Reference Example.

FIG. 8 is a V-T curve illustrating the change of the linear transmittance T relative to the drive voltage applied to the light control sheet 100 of the Reference Example. V-T curves 51 to 53 are V-T curves measured in three measurement positions different from one another in one light control sheet 100. In the opaque mode, the linear transmittance T converges to a minimum value Ta. In the transparent mode, the linear transmittance converges to a maximum value Tb. In the middle tone mode in which the linear transmittance T is between minimum value Ta and maximum value Tb, the variance in the linear transmittance T in the measurement positions different from one another sometimes increases when a drive voltage enabling the middle tone to be exhibited is applied to the light control sheet 100. This is because the change ratio ΔT/V of the linear transmittance T per 1 V when a drive voltage enabling the middle tone to be exhibited is applied to the light control sheet 100 is greater than in the opaque mode and in the transparent mode. When the change ratio ΔT/V is large, a middle linear transmittance can be achieved, but a difference in an electric field formed in the plane of the light control sheet 100 is expressed as a difference in the linear transmittance T. When the variance in a linear transmittance T is large in this manner, regions having transparencies different from one another are sometimes formed in a mottled manner as illustrated in FIG. 7.

Next, characteristics of the light control sheet 10N in the present embodiment will be described.

Variance in Linear Transmittance

The magnitude of the variance in the linear transmittance T of the light control sheet 10N in the middle tone can be expressed by a variance in a drive voltage in the middle tone mode calculated according to the following procedure.

In three or more measurement positions in the plane of the light control sheet 10N, linear transmittances T in the measurement positions were individually measured while changing the drive voltage, and a V-T curve for each measurement position is acquired.

For the V-T curve at each of the measurement positions, a voltage range between a drive voltage bringing the light control sheet 10N into the opaque mode and a drive voltage bringing into the transparent mode is identified. Specifically, a voltage range in which the absolute value of the change ratio per "1 V" of the linear transmittance T in the V-T curve is 0.5(%/V) or more is identified for the V-T curve of each of the measurement positions. This voltage range is the range of the drive voltage enabling the middle tone to be exhibited in the light control sheet 10N at the measurement position where the voltage range is identified.

Figure 9:
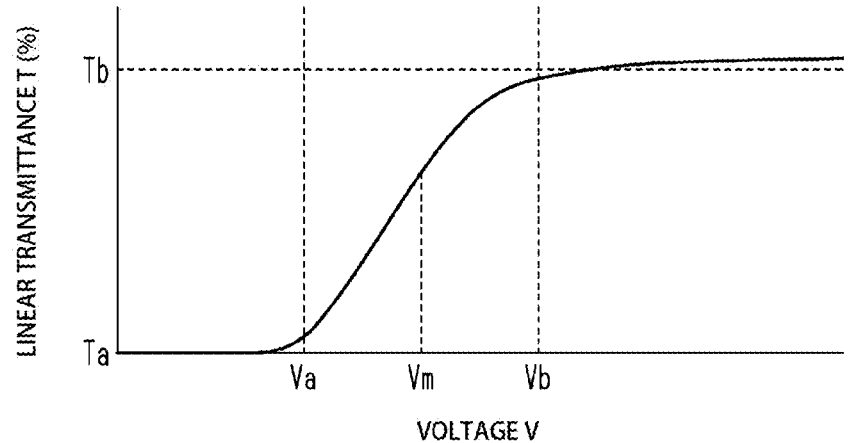
FIG. 9 is a graph illustrating a voltage vs. linear transmittance curve of a light control sheet.

As exemplified in FIG. 9, the lower limit value in the voltage range exhibiting the middle tone is defined as "first voltage Va", the upper limit value is defined as "second voltage Vb", and the middle value {(Va+Vb)/2} therebetween is defined as "middle value Vm". Then, first voltage Va, second voltage Vb, and middle value Vm are obtained for each measurement position. This middle value Vm is a drive voltage that brings the linear transmittance T of the light control sheet into substantially the middle between minimum value Ta and maximum value Tb.

When the number of measurement positions is "n (≥3)", middle values Vm (Vm1, Vm2, . . . Vmn) are obtained for measurement positions P (P1, P2, . . . Pn). From the obtained middle values Vm, "minimum value Vmin" and "maximum value Vmax" as well as average value "Vavr" of middle values Vm are obtained. The value obtained by dividing a difference between maximum value Vmax and minimum value Vmin by the average value Vavr, expressed as a percentage, as in equation (1) below is defined as variance Vmv in middle value Vm.

$$Vmv(\%) = \{(Vmax - Vmin)/Vavr\} \times 100 \quad (1)$$

The variance Vmv in the middle value Vm of the light control sheet 10N calculated as described above is 35.0% or less. When the variance Vmv in the middle value Vm exceeds 35.0%, a variance in a linear transmittance T becomes visible to the human eye.

Thickness of Light Control Layer

The thicknesses of the light control layer 11 measured in multiple measurement positions in the light control layer 11 are within a range that is 0.8 times or more and 1.2 times or less the median value of the thicknesses in the measurement positions. In other words, a difference between each of the thicknesses of the light control layer 11 measured in the measurement positions and the median value falls within a range that is "−20%" or more and "+20%" or less of the median value. The present inventors found that the variance in the linear transmittance T of the light control sheet 10N is attributable to the variance in the thickness of the light control layer 11. The variance Vmv in the middle value Vm can be reduced by reducing the variance in the thickness of the light control layer 11. It is noted that the number of measurement positions, in an A4 size of 210 mm×297 mm, is 3 or more and preferably 10 or more. A median value is a value that is positioned in the center when the thicknesses of the light control layer 11 in the measurement positions are listed in descending order.

Spacer-Occupied Area

When the light control layer 11 is observed through the first transparent electrode layer 12A or the second transparent electrode layer 12B, the area occupied by the spacers 115 in the entire observed surface is preferably 0.9% or more and 30.0% or less. The area occupied by the spacers 115 can be calculated by observing a predetermined area of the light control layer 11 through an optical microscope. The predetermined area to be observed is, for example, an area of 1 mm×1 mm. Although existence of the spacers 115 is unlikely to be recognized by the naked eye in the transparent mode, the refractive index of the spacers 115 differs from the refractive index of the resin layer 111, and thus the spacers 115 exhibit a slightly whiter color than the regions having no spacers 115, and distinguishing them from a region where no spacers 115 are contained is possible when observed through an optical microscope. Therefore, the area occupancy ratio of the spacers 115 can be calculated by dividing the area occupied by the spacers 115, which is a sum of areas of the spacers 115 in the observation of the above-described predetermined range, by the total area of the above-described predetermined range. When the area occupancy ratio of the spacers 115 is less than 0.9%, a gap between the first transparent electrode layer 12A and the second transparent electrode layer 12B cannot be appropriately controlled, which increases the variance in the thickness of the light control layer 11. When the area occupancy ratio of the spacers 115 exceeds 30.0%, the proportion of the spacers 115 in the light control layer 11 is excessively large, which decreases transparency of the light control sheet 10N in the transparent state. Also, when the area occupancy ratio of the spacers 115 is 15.0% or less, transparency when the light control sheet 10N is driven to be in a transparent state can be further enhanced.

Mode-Switching Voltage

The phenomenon in which variance in the linear transmittance of the light control sheet 10N occurs becomes significant when, in the V-T curve, the curve in a range of equal to or more than first voltage Va, which brings the linear transmittance T into minimum value Ta, and equal to or less than second voltage Vb, which brings the linear transmittance T into maximum value Tb, is steep. When the slope of the V-T curve is gradual, the change in the linear transmittance T per unit voltage is small even if there is variance in the linear transmittance among positions different from one another in the plane, and thus variance in the linear transmittance is unlikely to be discerned from its appearance.

Figure 10:
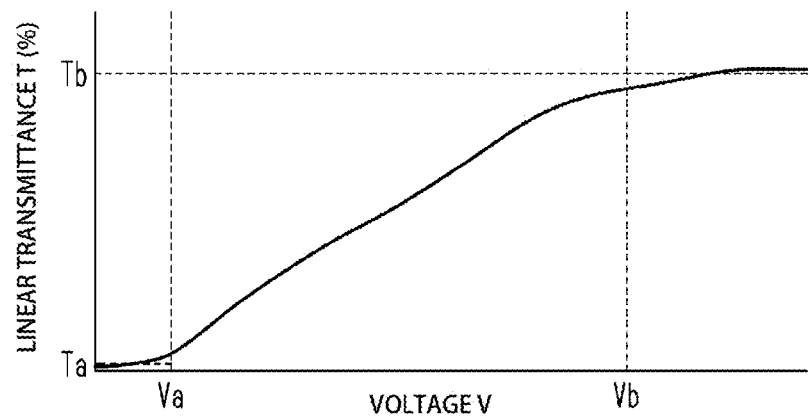
FIG. 10 is a graph illustrating a voltage vs. linear transmittance curve of a light control sheet of a Reference Example.

FIG. 10 shows a V-T curve having a gradual slope in the region where the linear transmittance is greater than the minimum value Ta and less than the maximum value Tb. In this case, the variance in the linear transmittance is unlikely to be recognized by the human eye, but a response time required for reversible switching between the opaque mode and the transparent mode is lengthened. Therefore, when it is required to enhance the responsivity of switching, a voltage difference for reversibly switching between the opaque mode and the transparent mode is preferably 22 V or less when the light control sheet 10N is a so-called A4 size of 210 mm×297 mm.

In the light control sheet 10N constituted by polymer-dispersed liquid crystals, if the resin layer including the light control layer 11 does not contain independent voids 116 or voids 116 having shapes partially joined with other independent voids in an appropriate state, the difference between the first voltage Va and second voltage Vb will not be less than 22 V, and the response speed will be reduced. For achieving good light scattering properties in the visible light range, it is preferable that the voids 116 have a diameter, as a maximum inner diameter, of 0.4 μm or more and 2.2 μm or less, and a large number of the voids 116 be disposed in the resin layer 111. When the diameter of the voids 116 is 0.4 μm or more, translucency is suppressed in the opaque mode, and sufficient haze can be obtained. Also, when the diameter of the voids 116 is 2.2 μm or less, the proportion of the resin layer in the light control layer 11 is prevented from being excessively small, and thus the strength of the light control layer 11 is prevented from being insufficient. When the multiple voids 116 are contained in the light control layer 11 in an appropriate state, and at least the thickness of the light control layer 11 and the variance Vmv of the middle value Vm of the light control sheet 10N satisfy the above-described conditions, a balance can be maintained between suppression of variance of the linear transmittance in the middle tone and an appropriate response speed.

According to the present embodiment, the advantageous effects listed below can be achieved.

(1) The state of the light control sheet 10N in which the absolute value of the change ratio of the linear transmittance per unit voltage of the light control sheet 10N is 0.5%/V or more can achieve the linear transmittance in the middle between the linear transmittance in the transparent mode and the linear transmittance in the opaque mode. According to the present embodiment, the thicknesses of the light control layer 11 measured in the measurement positions are within a range of 0.8 times or more and 1.2 times or less the median value of the thicknesses, and thus the variance in middle value Vm between first voltage Va as the lower limit value of the drive voltage corresponding to the middle tone and second voltage Vb as the upper limit value is suppressed to or less. When the variance in middle value Vm is reduced, the variance in the linear transmittance can be reduced when a certain drive voltage around the middle value Vm is applied to be put to the middle tone mode. As a result, aesthetic appearance of the light control sheet 10N in the middle tone mode can be enhanced.

Also, according to the above-described embodiment, the variance in the linear transmittance of the light control sheet 10N can be suppressed without lowering the response speed required for switching the mode, when the light control layer 11 has a structure in which the liquid crystal molecules 114 are contained in the voids 116. This enables practical use of a light control sheet having a middle tone mode in which aesthetic appearance and practicality are maintained. Therefore, designability of the light control sheet 10N can be enhanced by adding the middle tone mode as one of the drive modes.

(2) When the light control layer 11 has a structure in which the liquid crystal molecules 114 are contained in the voids 116, the variance in the linear transmittance in the middle tone can be suppressed without excessively decreasing the response speed required for switching between the opaque mode and the transparent mode.

(3) Since the area occupancy ratio, which is the ratio of the area occupied by the spacers 115, is 0.9% or more and 30.0% or less, a gap between the first transparent electrode layer 12A and the second transparent electrode layer 12B can be controlled to reduce the variance in the thickness of the light control layer 11, and the linear transmittance derived from the spacers 115 in the transparent mode can be reduced.

(4) When the diameter of the voids 116 in the resin layer 111 constituting the light control layer 11 is 0.4 μm or more and 2.2 μm or less, the liquid crystal molecules 114 are likely to be oriented along an electric field in the voids 116 of the resin layer 111. This facilitates control of the linear transmittance of the light control sheet 10. Also, no translucency occurs in the opaque mode, and good light scattering properties in the visible light region can be obtained.

(5) Since a difference between first voltage Va as the lower limit value and second voltage Vb as the upper limit value of the drive voltage which brings the change ratio of the linear transmittance T into 0.5%/V is 22 V or less, the response speed required for transition between the transparent state and the opaque mode can be appropriately set. Also, the power consumption required for transition between the transparent state and the opaque mode can be reduced.

Modification Examples

The above-described embodiment can be implemented with modifications as described below. The following modification examples may be implemented in combination.

In the above-described embodiment, the light control sheet 10N was a normal-type light control sheet. Instead, the light control sheet 10 may be a reverse-type light control sheet.

Figure 11:
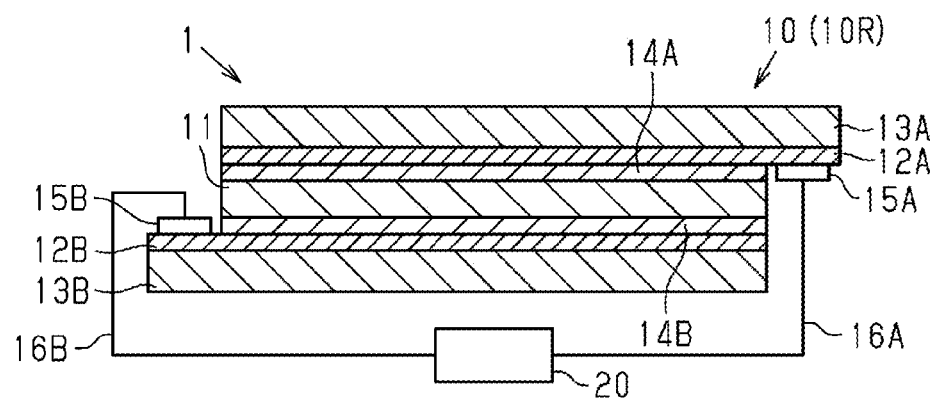
FIG. 11 is a cross-sectional view illustrating a reverse-type light control sheet.
Figure 13:
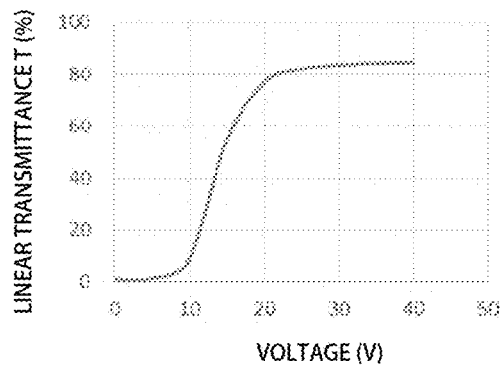
FIG. 13 is a graph illustrating a voltage vs. linear transmittance curve of a light control sheet of Example 1.
Figure 14:
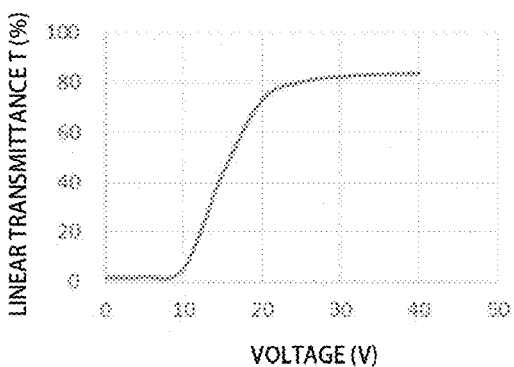
FIG. 14 is a graph illustrating a voltage vs. linear transmittance curve of a light control sheet of Example 2.
Figure 15:
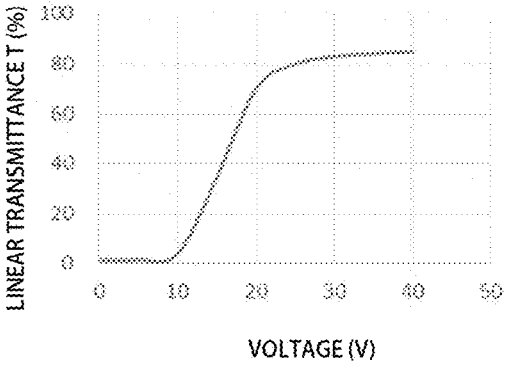
FIG. 15 is a graph illustrating a voltage vs. linear transmittance curve of a light control sheet of Example 3.
Figure 16:
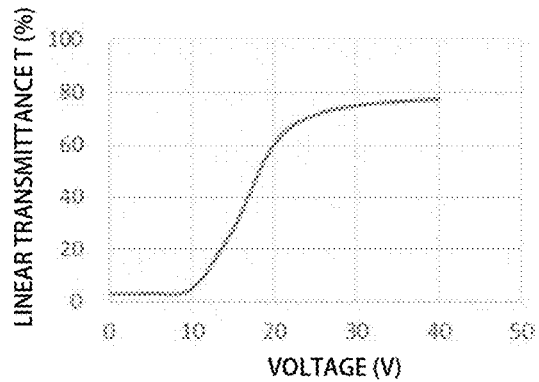
FIG. 16 is a graph illustrating a voltage vs. linear transmittance curve of a light control sheet of Example 4.
Figure 17:
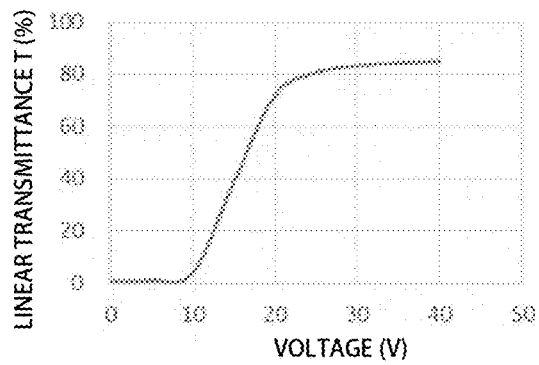
FIG. 17 is a graph illustrating a voltage vs. linear transmittance curve of a light control sheet of Comparative Example 1.
Figure 18:
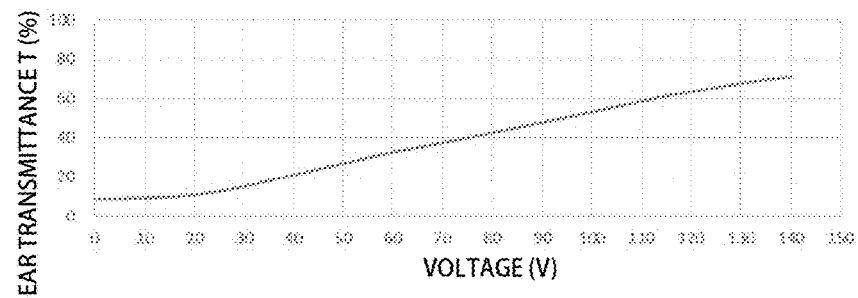
FIG. 18 is a graph illustrating a voltage vs. linear transmittance curve of a light control sheet of Comparative Example 2.
Figure 19:
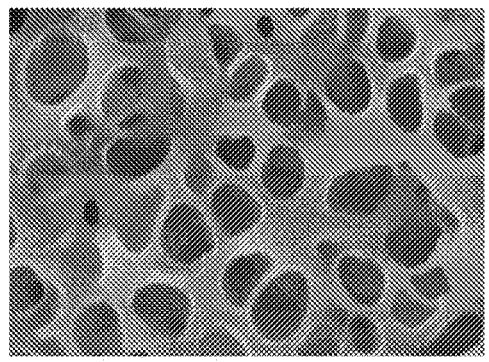
FIG. 19 is an electron microscope photograph illustrating a light control layer of a light control sheet of Example 1.
Figure 20:
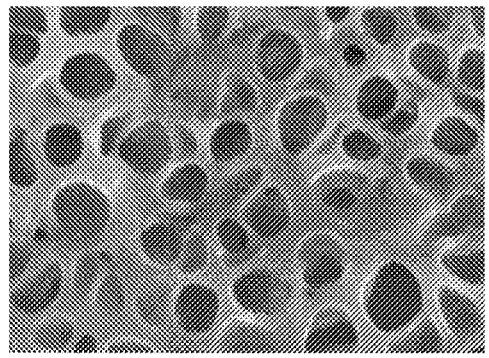
FIG. 20 is an electron microscope photograph illustrating a light control layer of a light control sheet of Example 2.
Figure 21:
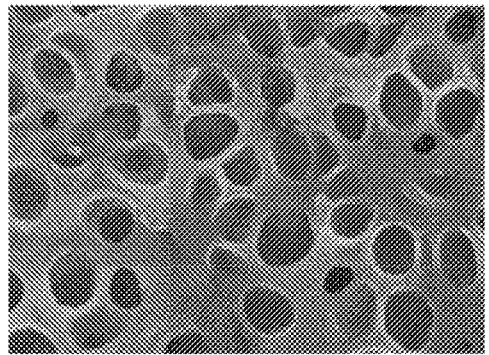
FIG. 21 is an electron microscope photograph illustrating a light control layer of a light control sheet of Example 3.
Figure 22:
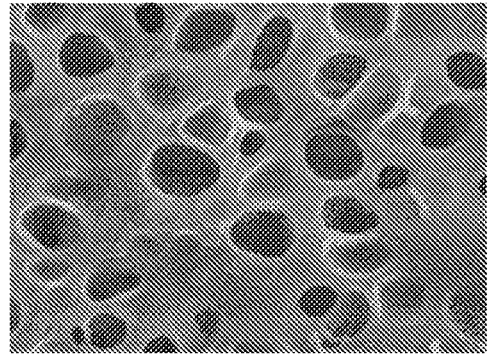
FIG. 22 is an electron microscope photograph illustrating a light control layer of a light control sheet of Example 4.
Figure 23:
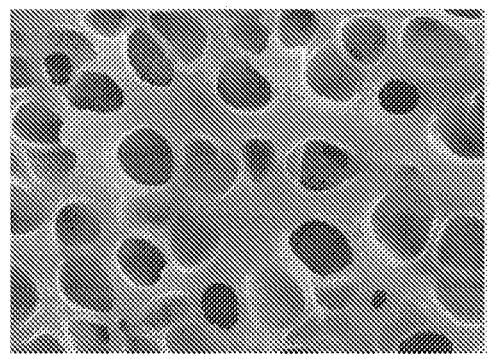
FIG. 23 is an electron microscope photograph illustrating a light control layer of a light control sheet of Comparative Example 1.
Figure 24:
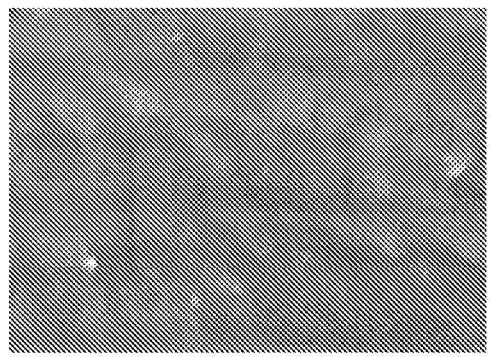
FIG. 24 is an electron microscope photograph illustrating a light control layer of a light control sheet of Comparative Example 2.

FIG. 11 is a view illustrating a reverse-type light control sheet 10R. The reverse-type light control sheet 10R includes, in addition to the light control layer 11, the first transparent electrode layer 12A, the second transparent electrode layer 12B, the first transparent support layer 13A, and the second transparent support layer 13B, a first orientation layer 14A and a second orientation layer 14B as a pair of orientation layers that sandwich the light control layer 11. The first orientation layer 14A is positioned between the light control layer 11 and the first transparent electrode layer 12A, and the second orientation layer 14B is positioned between the light control layer 11 and the second transparent electrode layer 12B.

When the first transparent electrode layer 12A and the second transparent electrode layer 12B are at equipotential, the first orientation layer 14A and the second orientation layer 14B orient the liquid crystal molecules 114 contained in the light control layer 11 such that the major axis direction of the liquid crystal molecules 114 extends along the normal direction of the first orientation layer 14A and the second orientation layer 14B. On the other hand, when a potential difference is applied between the first transparent electrode layer 12A and the second transparent electrode layer 12B, the first orientation layer 14A and the second orientation layer 14B orient the liquid crystal molecules 114 contained in the light control layer 11 such that the major axis direction of the liquid crystal molecules 114 is in a direction outside the normal direction. For example, the major axis direction of the liquid crystal molecules 114 is set to be irregular or aligned parallel to a substrate. Materials for forming the first orientation layer 14A and the second orientation layer 14B are, for example, polyesters such as polyamide, polyimide, polycarbonate, polystyrene, polysiloxane, polyethylene terephthalate, and polyethylene naphthalate, and polyacrylates such as polymethylmethacrylate. Also, usable liquid crystal molecules may have negative dielectric anisotropy and a dielectric constant smaller in their major axis direction than in their minor axis direction. In this light control sheet 10R, the transparent mode is an example of the first mode, the opaque mode is an example of the second mode, and the middle tone mode is an example of the third mode. Conditions such as the variance Vmv in the middle value Vm of the light control sheet 10R, the thickness of the light control layer 11, the spacer-occupied area, and the mode-switching voltage are the same between the reverse-type light control sheet 10R and the light control sheet 10N of the above-described embodiment.

In the above-described embodiment, the light control sheet 10N includes the light control layer 11 that contains the spacers 115. However, the normal-type light control sheet 10N and the reverse-type light control sheet 10R may be configured to include the light control layer 11 that does not contain the spacers 115, if the variance in the thickness of the light control layer 11 is in a range of 0.8 time or more and 1.2 times or less the median value of the thicknesses.

In the above-described embodiment, the light control layer 11 had a structure in which the resin layer 111 and the liquid crystal composition 112 are included. However, the light control sheet 10 may use a suspended particle device (SPD) technique with light-adjusting particles as orientation particles. The SPD technique is a technique of dispersing, in a resin matrix, a light-adjusting suspension that contains light-adjusting particles. The variance Vmv in the middle value Vm of the light control sheet 10, the thickness of the light control layer 11, the spacer-occupied area, and the mode-switching voltage are the same between a light control sheet of the SPD technique and the above-described embodiment.

EXAMPLES

With reference to FIG. 12 to FIG. 24, examples of the above-described embodiment will be specifically described. It is noted that these examples do not limit the present invention.

Example 1

A pair of PET substrates each having an ITO film formed thereon was prepared. The thickness of the ITO film was 30 nm, and the thickness of the PET substrate was 125 Next, a dispersion liquid, in which spacers having a diameter of 25 μm and containing divinylbenzene as a main material were dispersed in an alcohol-based solvent, was prepared. Then, this dispersion liquid was applied on the PET substrate having an ITO film disposed thereto and heated at 100° C. by an oven to remove the solvent. The area occupancy ratio of the spacers was obtained by observing a range of 1 mm×1 mm in an optional position of the light control sheet through an optical microscope. The ratio of a visually recognized white region to the observed range was calculated as an area occupancy ratio of spacers. A range of 1 mm×1 mm in another position of the light control sheet was also observed in the same way. The area occupancy ratio was obtained for each of five observed ranges. Then, an average of the area occupancy ratios was obtained. The spacer-occupied area of Example 1 was 1.50%.

The transparent electrode layer sprayed with the spacers was coated with a polymer-dispersed liquid crystal paint (KN-F-001-01-00, manufacture by Kyushu Nanotec Optical Co., Ltd.). Thereafter, UV irradiation was performed under nitrogen atmosphere for an irradiation time of 30 seconds with a high-pressure mercury lamp having an illuminance of 20 mW/cm2 by cutting wavelengths of 350 nm or less. During the UV irradiation, the temperature in the irradiation apparatus was controlled to 25° C. The thus obtained sheet including the light control layer formed thereto and the other ITO film-attached PET substrate were laminated and bonded under pressure to obtain a light control sheet.

Next, the light control sheet 10 was cut into a rectangular shape having a width of 210 mm and a length of 297 mm. Also, a notch was made at the end that is a short side of one surface of the light control sheet 10, and the PET substrate as one of the transparent support layer and the transparent electrode layer supported by the PET substrate were peeled over 25 mm in the width direction and 3 mm in the length direction from the light control sheet using a metal plate. Furthermore, a portion of the light control layer 11 exposed by the peeling of the PET substrate and the transparent electrode layer was removed from the light control sheet 10 with a solvent such as isopropyl alcohol, ethyl acetate, or toluene so that the other of the transparent electrode layers was exposed. Accordingly, a first terminal unit was formed in the light control sheet 10. On the other surface of the light control sheet 10, the same process was performed on a site, on a short side on which the first terminal unit was formed, away from a site where the first terminal unit was formed in the extending direction of the short side, so that one of the transparent electrode layers was exposed. Accordingly, a second terminal unit was formed on the light control sheet 10.

Example 2

A light control sheet of Example 2 was prepared by spraying spacers such that the area occupancy ratio of the spacers became 15.0% and in the same manner as in Example 1 except for the area occupancy ratio of the spacers.

Example 3

A light control sheet of Example 3 was prepared by spraying spacers such that the area occupancy ratio of the spacers became 0.9% and in the same manner as in Example 1 except for the area occupancy ratio of the spacers.

Example 4

A light control sheet of Example 4 was prepared by spraying spacers such that the area occupancy ratio of the spacers became 30.0% and in the same manner as in Example 1 except for the area occupancy ratio of the spacers.

Comparative Example 1

A light control sheet of Comparative Example 1 was prepared by spraying spacers such that the area occupancy ratio of the spacers became 0.45% and in the same manner as in Example 1 except for the area occupancy ratio of the spacers.

Comparative Example 2

A transparent electrode layer sprayed with spacers was coated with a polymer-dispersed liquid crystal paint, in the same manner as in Example 1. Thereafter, the temperature in the irradiation apparatus was controlled to 45° C. during UV irradiation. Then, a light control sheet of Comparative Example 2 was prepared in the same manner as in Example 1 except for the temperature during UV irradiation.

Evaluation of Light Control Sheet

FIG. 12 is a table illustrating results of evaluation performed on the following items for Examples 1 to 4 and Comparative Examples 1 and 2.

Variance in Linear Transmittance

For each of the light control sheets of Examples 1 to 4 and Comparative Examples 1 and 2, linear transmittance was measured at five measurement positions. The first terminal unit and the second terminal unit, which are a portion of the transparent electrode layer exposed by peeling the PET substrate and the transparent electrode layer, were connected to an AC power source device (PCR-3000WE manufactured by Kikusui Electronics Corporation), and voltage was increased between the transparent electrode layers at a frequency of 60 Hz from 0 V until the linear transmittance was saturated. Also, for one measurement position, linear transmittance was measured every time voltage was increased by 5 V using a haze meter (NDH-7000SP manufactured by Suga Test Instruments Co., Ltd.). Furthermore, the relationship between the drive voltage and the linear transmittance was graphically illustrated to obtain a V-T curve. FIG. 13 to FIG. 18 are examples of the V-T curve in Examples 1 to 4 and Comparative Examples 1 and 2.

For each of other measurement positions in the plane of the light control sheet, the V-T curve was obtained by the same procedure as the above-described procedure.

Of the five measurement positions, two locations were 30 mm away from one short side where the first terminal unit and the second terminal unit were disposed toward the other short side and individually 30 mm away from one long side and 30 mm away from the other side. Another two locations were 30 mm away from a short side where the first terminal unit and the second terminal unit were not disposed toward a short side where the first terminal unit and the second terminal unit were disposed and individually 30 mm away from one long side and 30 mm away from the other long side. The remaining one location is a location in the center portion when the light control sheet is viewed from the front. That is, in the rectangular light control sheet 10 having a width of 210 mm and a length of 297 mm, the five measurement positions were four corners, 30 mm away from the edges of the light control sheet 10, and in the center portion of the light control sheet 10. The measurement positions of the linear transmittance were such that the variance in the linear transmittance of the entirety of the light control sheet 10N was represented.

For the V-T curve obtained in each of the measurement positions, a range in which the absolute value of the change ratio of the linear transmittance T is 0.5 (%/V) or more was specified. Furthermore, the lower limit value in the specified voltage range was defined as "first voltage Va", the upper limit value was defined as "second voltage Vb", and the middle value thereof {(Va+Vb)/2} was defined as "middle value Vm". Also, of the middle values Vm obtained for measurement positions different from one another in one light control sheet, "minimum value Vmin", "maximum value Vmax", and average value "Vavr" of middle values Vm were obtained. Then, a value obtained by dividing a difference between maximum value Vmax and minimum value Vmin by average value Vavr as in equation (1) described above was defined as variance Vmv in middle value Vm.

Thickness of Light Control Layer

The cross section of the light control sheet was observed through a scanning electron microscope to measure the entire thickness as the thickness of the entire light control sheet. Also, the cross section of the light control sheet was observed through a scanning electron microscope to measure the thickness of the transparent support layer with the transparent electrode layer, i.e., the support layer thickness as the sum of the thickness of the PET substrate and the thickness of the transparent electrode layer. The support layer thickness was subtracted from the entire thickness to obtain the thickness of the light control layer. For each of ten locations different from one another on the front of the light control sheet 10N, the entire thickness and the support layer thickness were measured to obtain the thickness of the light control layer in each measurement position. The measurement positions for the thickness of the light control layer are such that in the same manner as the measurement positions for the linear transmittance, the variance in thickness in the entirety containing the edge portions and the center portion of the light control sheet 10N is expressed. Also, the median value, minimum value, and maximum value of the thicknesses of the light control layer in ten locations were obtained. Furthermore, the proportion of each of the absolute value of a difference between the minimum value and the median value and the absolute value of a difference between the median value and the maximum value to the median value was obtained.

Visual Appearance

The drive voltage applied to the light control sheet was changed, and the state of the middle tone was visually observed. "Excellent" or "Good" was assigned to a state in which visual transparency was uniform, and "Poor" was assigned to a state in which transparency was non-uniform and mottled. It is noted that "Good" was assigned when transparency in the transparent mode is practically sufficient, and "Excellent" was assigned when transparency in the transparent mode is further high.

Mode-Switching Voltage

For each of the above-described fived measurement positions, a voltage (Vb−Va) from first voltage Va to second voltage V was obtained as a voltage required for switching between the opaque mode and the transparent mode. Furthermore, an average value of voltages (Vb−Va) in five measurement positions was obtained. Since power consumed during reversible switching between the opaque mode and the transparent mode depends on voltage, the lower the voltage (Vb−Va) required for switching, the lower the power consumption. It is noted that when the voltage (Vb−Va) is high, the response speed during switching from the opaque mode to the transparent state is low, and time is required until switching is completed.

Size of Voids

The cross section of the light control layer was observed through a scanning electron microscope to obtain the size of voids. For obtaining the size of voids, the liquid crystal composition that contains liquid crystal molecules was firstly removed from the light control layer. From each of the light control sheets of Examples 1 to 4 and Comparative Examples 1 and 2, a square test piece with sides each having a length of 10 cm was cut out. Then, each test piece was immersed in isopropyl alcohol thereby to remove the liquid crystal composition from the light control layer. It is noted that the liquid crystal composition can be removed from the test piece by immersing the test piece in an organic solvent in which the liquid crystal composition can be dissolved and in which the resin layer cannot be dissolved.

Then, the cross section of the test piece from which the liquid crystal composition had been removed was imaged using a scanning electron microscope. In imaging, 30 rectangular regions were optionally selected for the cross section of the test piece. Then, an image of each of the regions was obtained at a magnification of 1000× using a scanning electron microscope. It is noted that the 30 rectangular regions were set such that a distance between neighboring rectangular regions was 1 mm or more.

FIG. 19 to FIG. 23 are electron microscope photographs of Examples 1 to 4 and Comparative Examples 1 and 2. In each image, ten voids were optionally selected, and the size of each void was measured. The maximum value and the minimum value of the sizes of the ten voids were set as a maximum value and a minimum value in the size of voids in the image. The maximum value and the minimum value in the size of voids were calculated in each image. The maximum value of the maximum values obtained in the images at 30 locations was set as a maximum value in the size of voids in the test piece. Also, the minimum value of the minimum values obtained in the images at 30 locations was set as a minimum value in the size of voids in the test piece.

It is noted that for a circular void of the voids contained in the image, the diameter of the void was set as the size of the void. Also, for an oval void of the voids contained in the image, the major axis of the void was set as the size of the void. Also, for an irregular void of the voids contained in the image, the diameter of a circumscribed circle of the void was set as the size of the void.

Evaluation Results

Variance in Thickness of Light Control Layer

For the light control sheets of Examples 1 to 4 and Comparative Example 2, the thicknesses of the light control layer in the measurement positions were contained in a range in which the absolute value of a difference from the median value is within 20%. On the other hand, in Comparative Example 1 in which the area occupancy ratio of spacers was lower than the suitable range, the absolute value of a difference between the thickness of the light control layer in each measurement position and the median value was up to 40%, demonstrating a large variance.

Variance in Linear Transmittance

It was demonstrated that in each of the light control sheets of Examples 1 to 4 and Comparative Example 2, the variance Vmv in middle value Vm between first voltage Va enabling the linear transmittance T to converge to minimum value Ta and second voltage Vb enabling the linear transmittance T to converge to maximum value Tb is 35.0% or less. On the other hand, it was demonstrated that in the light control sheet of Comparative Example 1 in which the area occupancy ratio of spacers was lower than the suitable range, and the variance in the thickness of the light control layer exceeded the suitable range, variance Vmv in middle value Vm was as large as 47.6%.

Visual Appearance

Examples 1 to 4 and Comparative Example 2 were judged "Excellent" or "Good". In Example 4 in which the area occupancy ratio of spacers exceeded the suitable range, a judgment "Good" was assigned because cloudiness somewhat occurred with insufficient transparency in the transparent mode. Also, it was demonstrated that in Example 4, the smallest value of the maximum values Tb of the linear transmittance T was 76.3%, which was lower than in Examples 1 to 3.

Size of Voids

In Examples 1 to 4 and Comparative Example 1, the average of the sizes of voids was 1.0 μm to 1.3 μm. In Examples 1 to 4 and Comparative Example 1, the shape of and distance between voids were similar. On the other hand, no voids were observed in Comparative Example 2.

Mode-Switching Voltage

In Examples 1 to 4 and Comparative Example 1, the voltage difference for switching between the transparent mode and the opaque mode was 19.0 V to 22.0 V. It was demonstrated that in Comparative Example 2, the voltage difference for switching between the transparent mode and the opaque mode was as large as 55.0 V.

It was demonstrated that when the variance in the thickness of the light control layer is small, such as when the absolute value of the difference between the thickness of the light control layer in each measurement position and the median value is 20% or less as described above, variance Vmv in the linear transmittance in the middle tone is suppressed to 35.0% or less. Also, it was demonstrated that in the light control sheet including the light control layer in which multiple voids having a size of 0.4 μm or more and 2.2 μm or less and a size average value of 1.0 μm or more and 1.3 μm or less are formed, variance Vmv in the linear transmittance is small, power consumption is low, and response speed is increased. It is noted that the effects demonstrated in the above-described examples are effects obtained when the distribution of middle values Vm is specified. Therefore, the above-described effects can be similarly obtained in the same manner as in the polymer dispersed light control sheet, in the polymer network light control sheet, in which the linear transmittance changes depending on an electric field produced in the light control sheet, when the distribution of middle values Vm is specified. Also, the effects demonstrated in the above-described examples are effects obtained when the size of voids in the light control layer is specified. Therefore, the above-described effects can be similarly obtained in the polymer network light control sheet in which liquid crystal molecules respond to an electric field inside voids formed in the light control sheet, when the size of voids is specified.

A light control sheet according to an embodiment of the present invention includes: a light control layer that contains a liquid crystal composition; and a pair of transparent electrode layers that sandwich the light control layer (for example, see JP 2017-187775 A). A light control device includes the above-described light control sheet and a driving unit that controls a drive voltage applied to the pair of transparent electrode layers. Depending on a potential difference between the pair of transparent electrode layers, the orientation state of liquid crystal molecules varies, and thus the linear transmittance of the light control sheet varies. The light control sheet is adhered to, for example, a building material such as a window glass or a glass wall, or a window glass of an automobile to serve as a partitioning member for partitioning two spaces.

For example, when the light control sheet also serves as decoration for a space, like a shoji screen door with shoji paper adhered having a pattern such as haze or shading, the application range as a partitioning member can be significantly expanded. However, the above-described light control sheet only indicates either a state that is colorless and transparent over the entire sheet or a state that exhibits a mere plain, cloudy color caused by light scattering, depending on the intensity of a drive voltage. Therefore, enhancing the designability of the light control sheet is strongly desired.

Alight control sheet according to an embodiment of the present invention includes: a light control layer that contains a resin layer and orientation particles; a pair of transparent electrode layers that sandwich the light control layer; and a pair of transparent support layers that sandwich the light control layer and a pair of the transparent electrode layers. Thicknesses of the light control layer measured in multiple measurement positions are within a range of 0.8 times or more and 1.2 times or less the median value of the thicknesses. The light control layer has a structure in which the orientation particles are contained in multiple voids dispersed in the resin layer. In a characteristic curve obtained by measuring the change in the linear transmittance of visible light when a drive voltage applied to the transparent electrode layers is changed, a first voltage Va is a lower limit drive voltage in a range in which the absolute value of the change ratio in the linear transmittance is 0.5%/V or more, a second voltage Vb is an upper limit drive voltage, and Vm is a middle value between the first voltage Va and the second voltage Vb. The variance in the middle value, $\{(Vmax-Vmin)/Vavr\}\times 100$, is 35.0% or less. The variance is obtained by dividing a difference between minimum value Vmin and maximum value Vmax of the middle values Vm obtained from the characteristic curves in the measurement positions, by average value Vavr of the middle values Vm.

A light control device according to an embodiment of the present invention includes: a light control sheet in which a linear transmittance changes depending on a drive voltage; and a driving unit that controls a drive voltage applied to the light control sheet. The light control sheet includes: a light control layer that contains a resin layer and orientation particles; a pair of transparent electrode layers that sandwich the light control layer; and a pair of transparent support layers that sandwich the light control layer and a pair of the transparent electrode layers. Thicknesses of the light control layer measured in multiple measurement positions are within a range of 0.8 times or more and 1.2 times or less the median value of the thicknesses. The light control layer has a structure in which the orientation particles are contained in multiple voids dispersed in the resin layer. In a characteristic curve obtained by measuring the change of the linear transmittance of visible light when a drive voltage applied to the transparent electrode layer is changed, a first voltage Va is a lower limit drive voltage in a range in which the absolute value of the change ratio of the linear transmittance is 0.5%/V or more, a second voltage Vb is an upper limit drive voltage, and Vm is a middle value between the first voltage Va and the second voltage Vb. The variance in the middle value, $\{(Vmax-Vmin)/Vavr\}\times 100$, is 35.0% or less. The variance is obtained by dividing a difference between minimum value Vmin and maximum value Vmax of the middle values Vm obtained from the characteristic curves in the measurement positions, by average value Vavr of the middle values Vm. The driving unit switches among a first mode of not applying the drive voltage, a second mode of applying a voltage of equal to or more than the second voltage Vb, and a third mode of applying a voltage between the first voltage Va and the second voltage Vb such that the linear transmittance of the light control sheet becomes a linear transmittance between the linear transmittance in the first mode and the linear transmittance in the second mode.

The state of the light control sheet in which the absolute value of the change ratio of the linear transmittance per unit voltage of the light control sheet is 0.5%/V or more can achieve an intermediate linear transmittance between the linear transmittance in the transparent mode and the linear transmittance in the opaque mode. According to the above-described configuration, thicknesses of the light control layer measured in multiple measurement positions are within a range of 0.8 times or more and 1.2 times or less the median value of the thicknesses, and thus the variance in the middle value between first voltage Va as the lower limit value of the drive voltage for achieving a middle tone and second voltage Vb as the upper limit value is suppressed to 35.0% or less. When the variance in the middle value is 35.0% or less, unevenness in visually recognizable transparency when a certain drive voltage around the middle value is applied to be put to the middle tone mode can be prevented from occurring in the light control sheet. As a result, aesthetic appearance of the light control sheet in the middle tone mode can be enhanced. Therefore, designability of the light control sheet can be enhanced by adding the middle tone mode as one of the drive modes.

In the above-described light control sheet, the light control layer contains spacers that control a gap between a pair of the transparent electrode layers. The ratio of the total area occupied by the spacers to the entire area of the light control layer when the light control layer is observed from the surface in contact with the transparent electrode layer may be 0.9% or more and 30.0% or less.

According to the above-described configuration, the area occupancy ratio, which is the ratio of the area occupied by the spacers, is 0.9% or more and 30.0% or less, and thus a gap between the transparent electrode layers can be controlled to reduce the variance in the thickness of the light control layer, and a haze derived from the spacers in the transparent mode can be reduced. In the above-described light control sheet, the diameter of the voids may be 0.4 µm or more and 2.2 µm or less.

According to the above-described configuration, the diameter of the voids is 0.4 µm or more and 2.2 µm or less, and thus orientation of the orientation particles along an electric field is facilitated in the voids of the resin layer. This facilitates control of a linear transmittance. Also, no translucency occurs in the opaque mode, and good light scattering properties in the visible light region can be obtained.

In the above-described light control sheet, a difference between the first voltage Va and the second voltage Vb may be 22 V or less.

According to the above-described configuration, an appropriate response speed required for transition between the transparent mode and the opaque mode can be obtained. Also, power consumption required for transition between the transparent mode and the opaque mode can be reduced.

According to an embodiment of the present invention, designability of a light control sheet and a light control device that includes the light control sheet can be enhanced.

Obviously, numerous modifications and variations of the present invention are possible in light of the above teachings. It is therefore to be understood that within the scope of the appended claims, the invention may be practiced otherwise than as specifically described herein.

The invention claimed is:

1. A light control sheet, comprising:
a light control layer comprising a resin layer and orientation particles;
a pair of transparent electrode layers sandwiching the light control layer; and
a pair of transparent support layers sandwiching the light control layer and the pair of transparent electrode layers,
wherein the light control layer has thicknesses measured in a plurality of measurement positions such that the thicknesses are within a range of 0.8 times to 1.2 times a median value of the thicknesses and has a structure such that the resin layer has a plurality of voids and that the orientation particles are contained in the voids dispersed in the resin layer, and a variance in a middle value, $\{(Vmax-Vmin)/Vavr\} \times 100$, is 35.0% or less, where Vmin is a minimum value, Vmax is a maximum value, Vavr is an average value of middle values obtained from characteristic curves in the plurality of measurement positions, each of the characteristic curves is obtained by measuring a change of a linear transmittance of visible light when a drive voltage applied to the transparent electrode layers is changed, each of the middle values is a middle a value Vm between a first voltage Va and a second voltage Vb, the first voltage Va is a lower limit drive voltage of a range in which an absolute value of a change ratio in the linear transmittance is 0.5%/V or more, and the second voltage Vb is an upper limit drive voltage.

2. The light control sheet according to claim 1, wherein the light control layer includes a plurality of spacers controlling a gap between the pair of transparent electrode layers, and a ratio of a total area occupied by the spacers to an entire area of the light control layer when the light control layer is observed from a contact surface with the transparent electrode layer is in a range of 0.9% to 30.0%.

3. The light control sheet according to claim 1, wherein the light control layer is formed such that a diameter of the void is in a range of 0.4 μm to 2.2 μm.

4. The light control sheet according to claim 1, wherein a difference between the first voltage Va and the second voltage Vb is 22 V or less.

5. The light control sheet according to claim 2, wherein the light control layer is formed such that a diameter of the void is in a range of 0.4 μm to 2.2 μm.

6. The light control sheet according to claim 2, wherein a difference between the first voltage Va and the second voltage Vb is 22 V or less.

7. The light control sheet according to claim 3, wherein a difference between the first voltage Va and the second voltage Vb is 22 V or less.

8. The light control sheet according to claim 5, wherein a difference between the first voltage Va and the second voltage Vb is 22 V or less.

9. A light control device, comprising:
a light control sheet that changes a linear transmittance depending on a drive voltage; and
a driving unit comprising circuitry configured to control a drive voltage applied to the light control sheet,
wherein the light control sheet includes a light control layer comprising a resin layer and orientation particles, a pair of transparent electrode layers sandwiching the light control layer, and a pair of transparent support layers sandwiching the light control layer and the pair of transparent electrode layers, the light control layer has thicknesses measured in a plurality of measurement positions such that the thicknesses are within a range of 0.8 times to 1.2 times a median value of the thicknesses and has a structure such that the resin layer has a plurality of voids and that the orientation particles are contained in the voids dispersed in the resin layer, a variance in a middle value, $\{(Vmax-Vmin)/Vavr\} \times 100$, is 35.0% or less, where Vmin is a minimum value, Vmax is a maximum value, Vavr is an average value of middle values obtained from characteristic curves in the plurality of measurement positions, each of the characteristic curves is obtained by measuring a change of a linear transmittance of visible light when a drive voltage applied to the transparent electrode layers is changed, each of the middle values is a middle a value Vm between a first voltage Va and a second voltage Vb, the first voltage Va is a lower limit drive voltage of a range in which an absolute value of a change ratio in the linear transmittance is 0.5%/V or more, the second voltage Vb is an upper limit drive voltage, and the circuitry of the driving unit is configured to switch among a first mode of not applying the drive voltage, a second mode of applying a voltage of equal to or more than the second voltage Vb, and a third mode of applying a voltage between the first voltage Va and the second voltage Vb such that a linear transmittance of the light control sheet becomes a linear transmittance between a linear transmittance in the first mode and a linear transmittance in the second mode.

10. The light control device according to claim 9, wherein the light control layer includes a plurality of spacers controlling a gap between the pair of transparent electrode layers, and a ratio of a total area occupied by the spacers to an entire area of the light control layer when the light control layer is observed from a contact surface with the transparent electrode layer is in a range of 0.9% to 30.0%.

11. The light control device according to claim 9, wherein the light control layer is formed such that a diameter of the void is in a range of 0.4 μm to 2.2 μm.

12. The light control device according to claim 9, wherein a difference between the first voltage Va and the second voltage Vb is 22 V or less.

13. The light control device according to claim 10, wherein the light control layer is formed such that a diameter of the void is in a range of 0.4 μm to 2.2 μm.

14. The light control device according to claim 10, wherein a difference between the first voltage Va and the second voltage Vb is 22 V or less.

15. The light control device according to claim 11, wherein a difference between the first voltage Va and the second voltage Vb is 22 V or less.

16. The light control device according to claim 13, wherein a difference between the first voltage Va and the second voltage Vb is 22 V or less.

* * * * *